Nov. 2, 1971  J. R. JONES, JR  3,616,717
PAIRED CABLE CUTTERS AND METHOD OF USING SAME
Filed April 16, 1970
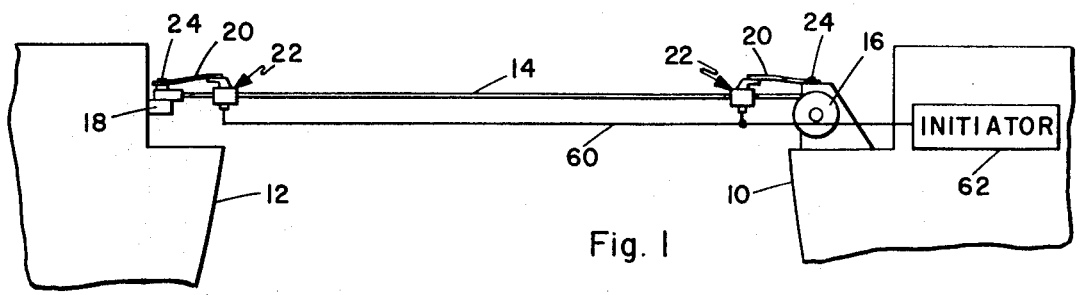
Fig. 1
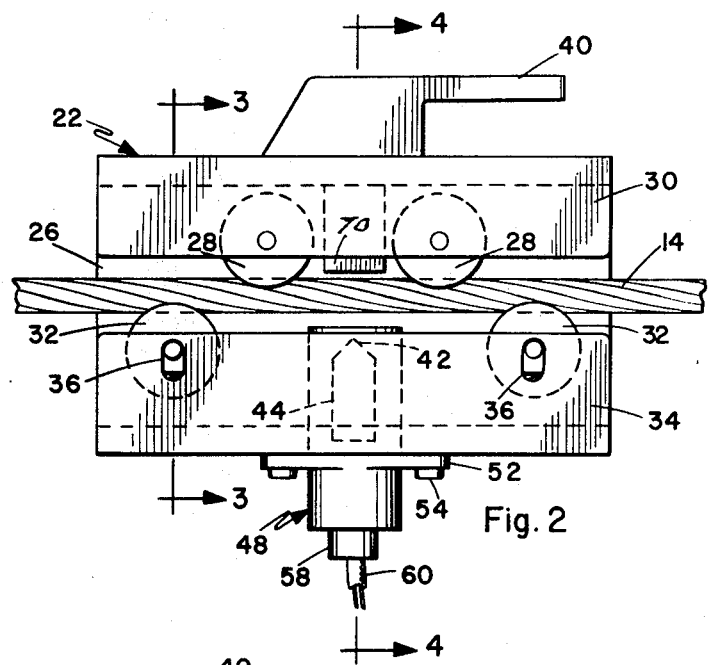
Fig. 2
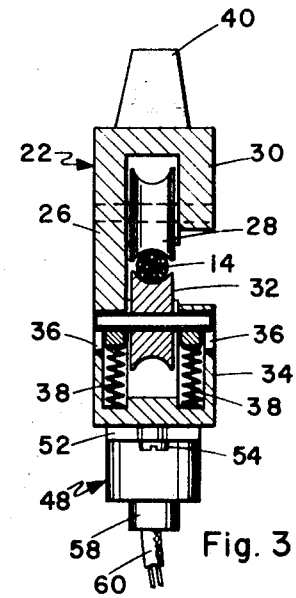
Fig. 3
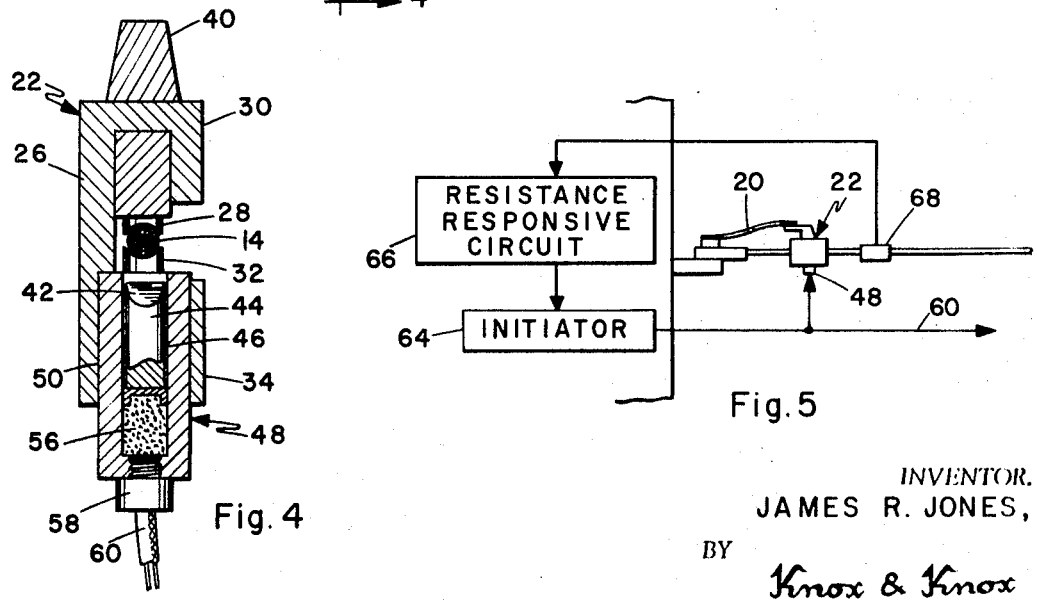
Fig. 4
Fig. 5
INVENTOR.
JAMES R. JONES, JR.
BY
Knox & Knox United States Patent Office 3,616,717
Patented Nov. 2, 1971

3,616,717
PAIRED CABLE CUTTERS AND METHOD
OF USING SAME
James R. Jones, Jr., 2944 Renault Place,
San Diego, Calif. 92122
Filed Apr. 16, 1970, Ser. No. 29,175
Int. Cl. B26d 11/00
U.S. Cl. 83—39                               8 Claims

ABSTRACT OF THE DISCLOSURE

Safe parting of a tensioned cable is achieved by simultaneously parting the cable at both ends so that even when the cable has been under high tension it will not whip toward either end. Personnel injury and property damage is thus prevented. One special use is the emergency cutting of cables between ships in re-fueling operations and the like where the operation is normally externally or manually initiated. Another use is in various types of towing procedures. As a variant system operation of the cutters is automatically initiated by a strain responsive device sensing overstrain in the cable.

BACKGROUND OF THE INVENTION

Navy ships and others regularly carry out replenishment of fuel, ammunition and/or supplies while underway. Should one ship become unable to maintain the necessary constant speed, or some other emergency arise, the lines between the ships must be disconnected very quickly as otherwise the ships will collide. This disconnection, in the prior art, is accomplished often by parting the cables but this is a hazardous operation because the tensioned cable when cut by personnel on one ship whips toward the other ship with great force. The cutting operation itself is also hazardous even when accomplished by a high velocity cable cutter which is an explosively operated cutter on a long pole. In towing operations, a proper catenary with much of the cable under water gives some protection but rupture of the towing line may prove dangerous. In other situations overstrain of cables causing possible rupture is difficult to predict and cable backlash may be a principal hazard. Explosive-operated cable cutters are well known but they have not been adapted for use in pairs and for simultaneous operation as herein disclosed.

SUMMARY OF THE INVENTION

The paired cutters and method of use effectively prevents backlash in the cable, the tensioned cable being cut at both ends so that it will fall free. The simultaneous parting at both places may be considered the essential feature of the invention. Since explosive-operated cutters have been proven effective, this type of cutter, in combination with a simple electrical circuit, is proposed in this disclosure for use with an exterior, manual initiator or switch means, or in an automatic version in which a strain gage type of instrument senses overstrain in the cable and initiates the cutters before a rupture can occur.

BRIEF DESCRIPTION OF THE DRAWINGS

FIG. 1 is a diagrammatic view of two vessels connected by a cable, with a pair of cable cutters in place;
FIG. 2 is a side elevation view of a single cable cutter;
FIG. 3 is a sectional view taken on line 3—3 of FIG. 2;
FIG. 4 is a sectional view taken on line 4—4 of FIG. 2; and
FIG. 5 is a diagram of an automatic cable cutting arrangement controlled by cable tension.

DESCRIPTION OF A PREFERRED EMBODIMENT

The hereindisclosed invention is obviously not limited to that depicted in the drawing but the same is illustrative of both the method and apparatus used in this invention.

A pair of vessel is diagrammatically indicated in FIG. 1 to illustrate perhaps the most obvious use of the invention, cables tensioned between two vessels, one of which would ordinarily be in process of replenishment from or in two of the other. A first vessel 10 and a second vessel 12 are shown connected by a cable 14. A winch 16 is indicated on the first vessel and the second vessel will ordinarily have means 18 for terminal attachment of the cable. Flexible tethers 20 connect the individual cable parting means, generally indicated by the numeral 22, to each vessel, as for example to the winch 16 by bolts or the like indicated at 24.

Referring now to an individual parting means or cutter, each comprises a C-frame 26 which may be elongated to provide for the mounting thereon of a pair of upper rollers or pulleys 28 in the upper bite portion 30 of the C-frame, and a pair of lower pulleys 32 in the lower bite portion 34 of the C-frame. The lower pulleys have their spindles in opposed pairs of slots 36 and are spring biased by coil springs 38 toward the upper pulleys. The opposed pairs of pulleys define a channel for the cable 14 which is held therebetween, and the tensioned cable supports the cutters 22, with the flexible tethers 20 allowing certain necessary movement of the cutters. Each C-frame 22 has a tether attachment bar 40 or an equivalent attachment means.

The C-frames are each equipped with an explosive-operated chisel 42 having a shank portion 44 which may be non-circular in cross-section and a reasonably close fit within a correspondingly shaped bore 46 of a cartridge 48 which is held in a bore 50 in the C-frame by integral attachment flanges 52 and screws 54. The chisel 42 acts against a fixed anvil 70. The lower portion of the cartridge functions as a breech for an explosive charge 56 and a detonator 58 is screwed into the lower extremity of the cartridge, this detonator being electrically connected by a non-tensioned two-wire conductor 60 to an electrical pulse initiator 62. This initiator 62 may be of simple switch type in a line to a power supply for external, manual control by personnel on the vessel 10 and, of course, it may be duplicated on the vessel 12 if desired. On the other hand an initiator 64 may be automatically controlled by a resistance responsive circuit indicated at 66 monitored by a strain gage 68 operatively connected on the cable 14 to send an electric pulse through the conductor 60 when the strain on the cable exceeds a predetermined upper safety level.

I claim:
1. In combination, a cable;
a pair of cable parting means operatively mounted on said cable, one parting means at each end of a tensioned section of the cable; and
means for simultaneously operating both said cable parting means for emergency separation of said section from the cable without cable backlash.
2. Apparatus according to claim 1 wherein said parting means is explosive-operated and the last mentioned means is electrical.
3. Apparatus according to claim 1 wherein the last mentioned means includes an initiator responsive to overstrain on said cable.
4. Apparatus according to claim 1 wherein the last mentioned means includues an externally controlled initiator.
5. Apparatus according to claim 1 and wherein each cable parting means comprises a tethered C-frame having cable engaging means with an explosive-operated chisel mounted in said frame on one side of said cable, and an anvil in said frame on the opposite side of said cable.

6. A method of emergency parting a cable under tension between two objects without cable backlash, comprising simultaneous parting of the cable adjacent each of said objects so that the section of tensioned cable between said objects does not whip toward either object.

7. A method according to claim 6 wherein said simultaneous parting is initiated manually.

8. A method according to claim 6 wherein said simultaneous parting is initiated by a strain sensitive device sensitive to overstrain in said cable.

References Cited

UNITED STATES PATENTS

| 1,397,911 | 11/1921 | Tossizza | 83—370 |
| 2,543,596 | 2/1951 | Penn | 83—925 R X |
| 3,361,020 | 1/1968 | Baker | 83—370 X |

FRANK T. YOST, Primary Examiner

U.S. Cl. X.R.

83—370, 516, 639, 925 R; 114—221 A